(12) United States Patent
Nishitsuji et al.

(10) Patent No.: US 7,765,709 B2
(45) Date of Patent: Aug. 3, 2010

(54) MEASURING APPARATUS

(75) Inventors: Yutaka Nishitsuji, Kobe (JP); Yoshiharu Kimura, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 12/357,090

(22) Filed: Jan. 21, 2009

(65) Prior Publication Data
US 2009/0188122 A1 Jul. 30, 2009

(30) Foreign Application Priority Data
Jan. 29, 2008 (JP) ............................. 2008-017391

(51) Int. Cl.
*G01B 5/004* (2006.01)
*G01B 3/00* (2006.01)

(52) U.S. Cl. .......................................... 33/503; 33/556

(58) Field of Classification Search .................. 33/503, 33/556, 702–704, 706–708, 783–784, 791, 33/792
See application file for complete search history.

(56) References Cited

U.S. PATENT DOCUMENTS

| 4,776,098 A | 10/1988 | Nelle |
| 5,050,311 A | 9/1991 | Nelle |
| 5,279,043 A * | 1/1994 | Rieder et al. .................. 33/702 |
| 5,375,338 A * | 12/1994 | Nelle ........................... 33/702 |
| 5,711,084 A | 1/1998 | Spanner et al. |
| 5,832,616 A * | 11/1998 | Fiedler ........................ 33/706 |
| 6,178,656 B1 * | 1/2001 | Jung ............................ 33/706 |
| 6,742,274 B2 * | 6/2004 | Kawada ....................... 33/702 |
| 6,766,587 B2 * | 7/2004 | Kawada ....................... 33/702 |
| 6,865,820 B2 * | 3/2005 | Burgschat et al. ............. 33/706 |
| 7,007,397 B2 * | 3/2006 | Kodama et al. ............... 33/706 |
| 7,225,555 B2 * | 6/2007 | Kawada et al. ................ 33/706 |
| 7,464,481 B2 * | 12/2008 | Ishikawa ...................... 33/503 |
| 2007/0137059 A1 * | 6/2007 | Holzapfel et al. ............. 33/706 |
| 2009/0188122 A1 * | 7/2009 | Nishitsuji et al. ............. 33/436 |

FOREIGN PATENT DOCUMENTS

JP     A-06-185950     7/1994

* cited by examiner

*Primary Examiner*—Yaritza Guadalupe-McCall
(74) *Attorney, Agent, or Firm*—Oliff & Berridge, PLC

(57) ABSTRACT

A scale base is fixed to a base in a plurality of locations which are aligned in a measuring direction (a Y direction) in which measurement by a scale is carried out, slits are provided in the scale base in positions lying between the locations where the scale base is fixed to the base, the scale is supported by the scale base in two or more of the locations where the scale base is fixed to the base, and the scale base has gaps between the base and the scale base in positions other than the locations where the scale base is fixed to the base and between the scale and the scale base in the positions other than the locations where the scale base is fixed to the base.

8 Claims, 3 Drawing Sheets

MEASURING APPARATUS

TECHNICAL FIELD

The present invention relates to a measuring apparatus and more particularly to a measuring apparatus for measuring a displacement with high accuracy which is suitable for use as a measuring apparatus including a base, a scale base fixed on to the base, and a scale supported on the scale base.

RELATED ART

In measuring a displacement of a measuring apparatus with high accuracy, it is desirable that the scale base to which the scale is fixed and the base to which the scale base is fixed are made using the same type of material as that of the scale or a material having physical properties close to those of a material making up the scale. For example, in the event that the scale is made of glass, the scale base and the base are desirably made of glass or stone. However, from the viewpoints of functionality, workability and production costs, the scale base and the base are made of a different type of material from the scale in many cases. For example, the scale is made of glass, while the scale base is made of a metal whose main constituent is iron and the base is made of stone. In this case, since thermal expansion coefficients of these three materials are different from each other, when the scale base is deformed by a change in temperature, the deformation of the scale base then deforms the scale due to a different in thermal expansion coefficient therebetween, resulting in a fear that deterioration in measuring accuracy is called for. In contrast to this, as is described in Patent Document 1, there has been proposed a method in which a scale base is held in place via a friction reduction material.

[Patent Document 1] JP-A-6-185950

In the method described in Patent Document 1, however, due to a difference in thermal expansion coefficient between a scale base and a rail to which the scale base is fixed, it is inevitable that the scale base is deformed relative to the rail. Further, due to the influence of the friction reduction material, a scale is made easy to slide relative to the scale base, and in the event that the scale base is deformed due to a change in temperature, there is caused a fear that an origin of the scale is made to move relative to the scale base.

SUMMARY

The invention has been made with a view to solving the problems inherent in the related art, and an object thereof is to provide a measuring apparatus which enables a highly accurate displacement measurement by a scale by preventing the deformation of a scale base which is generated by thermal expansion or contraction of the scale, scale base and/or a base due to a difference in thermal expansion coefficient therebetween.

According to a first aspect of the invention, there is provided a measuring apparatus comprising:

a base;

a scale base fixed to the base in a plurality of locations of the base which lie in a measuring direction in which measurement is implemented by the scale;

a scale supported on the scale base; and at least slit provided in the scale base in a position lying between the locations where the scale base is fixed to the base, wherein the scale is supported by the scale base at two or more of the locations where the scale base is fixed to the base, and wherein the scale base has gaps between the base and the scale base in positions other than the locations where the scale base is fixed to the base and between the scale and the scale base in positions other than the locations where the scale base supports the scale, respectively.

According to a second aspect of the invention, there is provided a measuring apparatus as set forth in the first aspect of the invention, further comprising:

an elastic member which presses the scale against the scale base to thereby be supported on the scale base.

According to a third aspect of the invention, there is provided a measuring apparatus as set forth in the first or second aspect of the invention, further comprising:

a friction reduction material, via which the scale is supported on the scale base.

According to a fourth aspect of the invention, there is provided a measuring apparatus as set forth in any of the first to third aspects of the invention, further comprising:

a restricting member provided at one end of the scale base for restricting a movement of the scale in the measuring direction.

According to the aspects of the invention, even though the scale, the scale base and the base are made using different materials, the deformation of the scale base can be reduced. Because of this, a highly accurate displacement measurement by the scale can be maintained.

DETAILED DESCRIPTION

Hereinafter, an embodiment of the invention will be described in detail by reference to the accompanying drawings.

Figure 1:
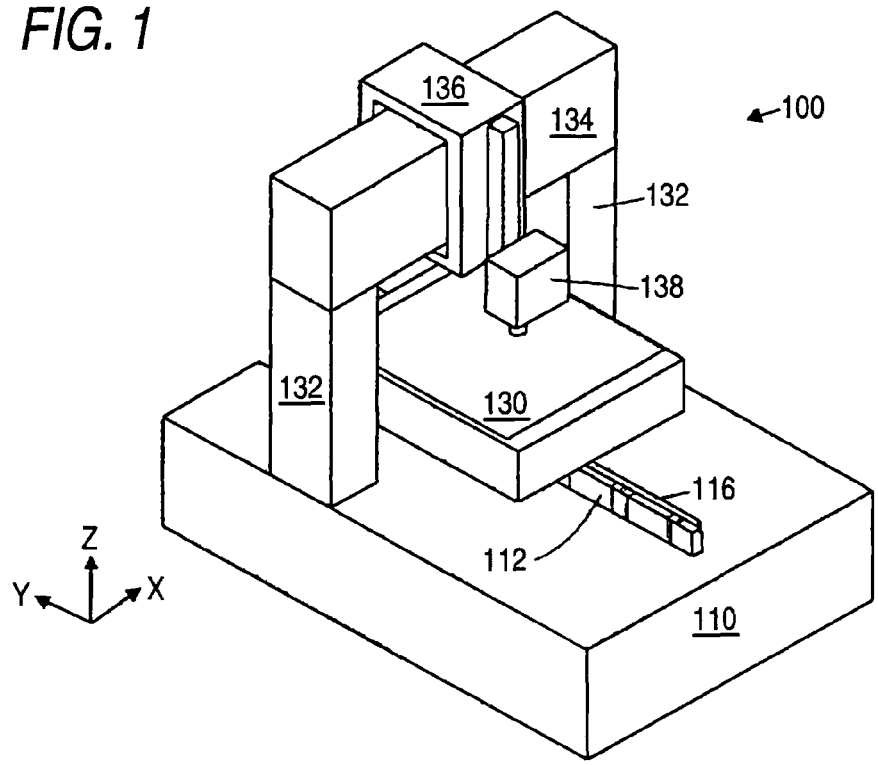
FIG. 1 shows an exemplary diagram of a measuring apparatus according to an embodiment of the invention.
Figure 2A:
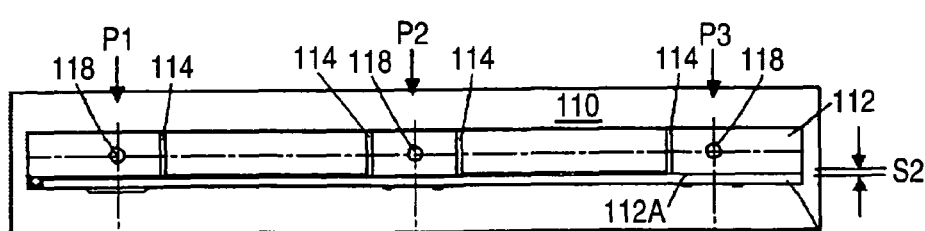
FIGS. 2A and 2B show an exemplary diagram showing the configuration of part of the measuring apparatus which is centered at a scale base.
Figure 2B:
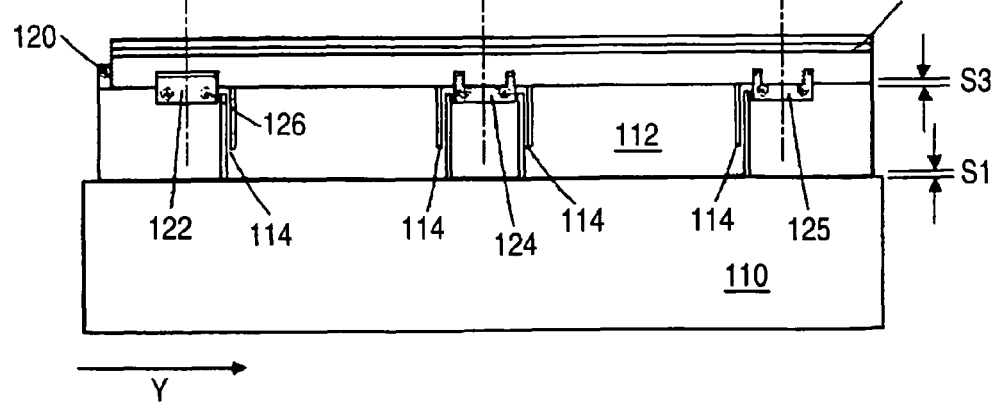
Figure 3:
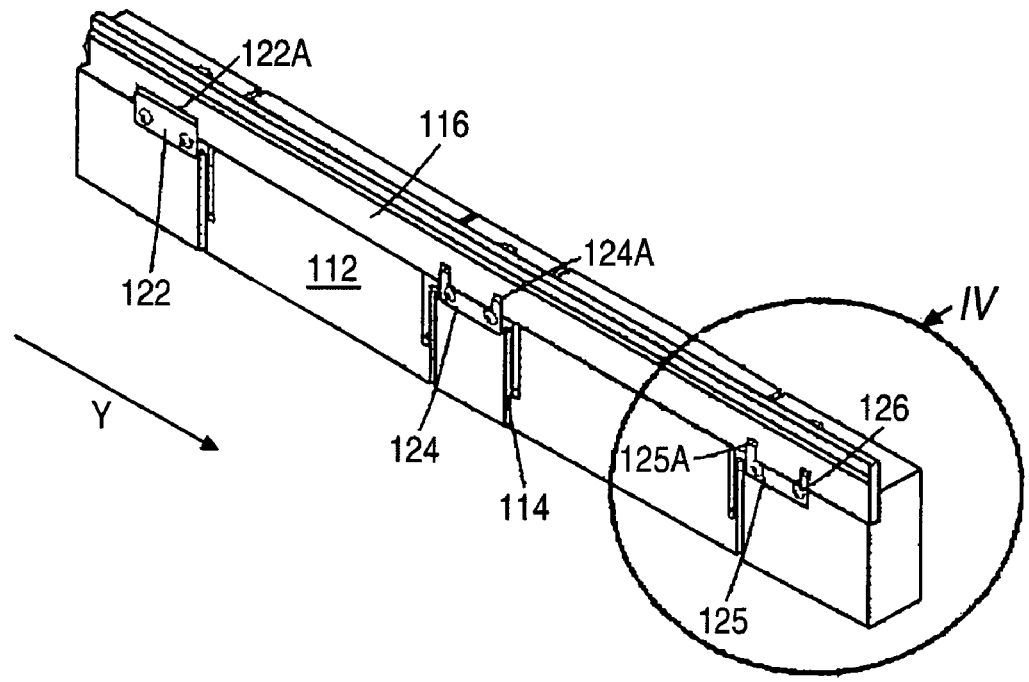
FIG. 3 shows a perspective view of the part of the measuring apparatus which is centered at the scale base.
Figure 4:
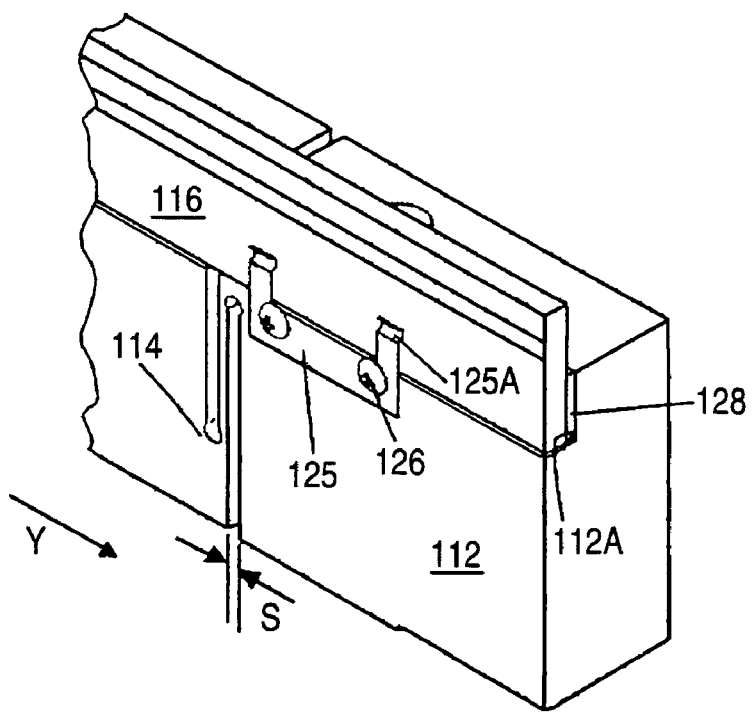
FIG. 4 shows an enlarged perspective view of a portion IV which is circled in FIG. 3.
Figure 5:
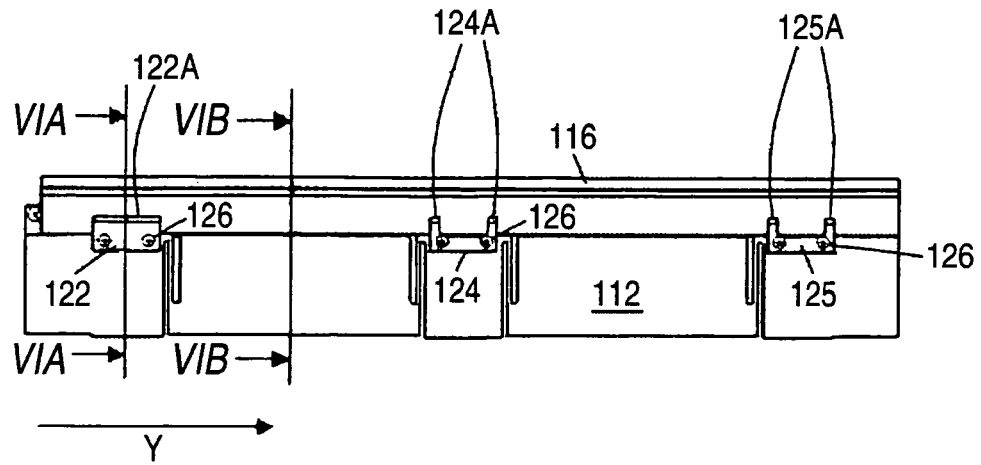
FIG. 5 shows an exemplary diagram showing the configuration of the part of the measuring apparatus which is centered at the scale base.
Figure 6A:
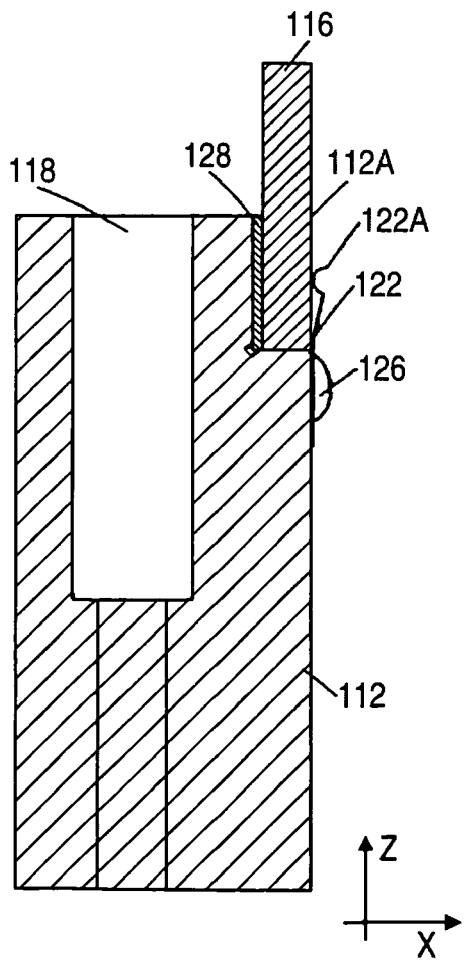
FIGS. 6A and 6B show sectional views taken along lines VIA-VIA and VIB-VIB shown in FIG. 5.
Figure 6B:
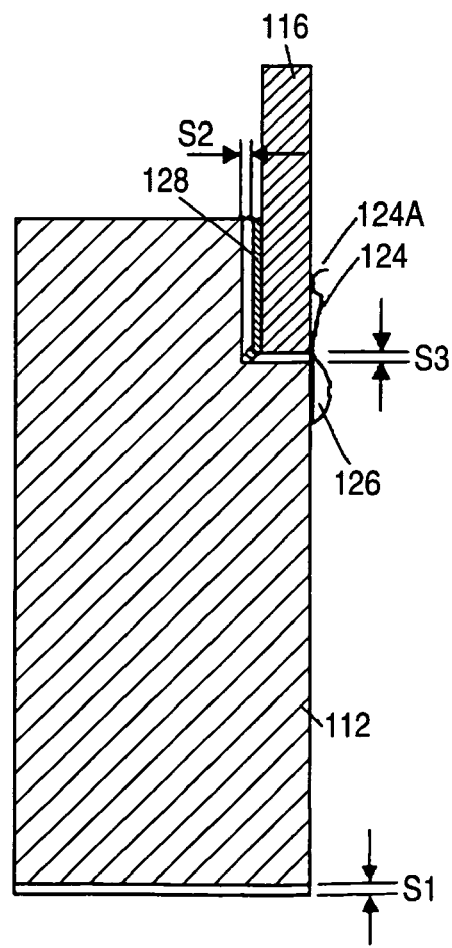

A first embodiment of the invention will be described by the use of FIGS. 1 to 6B. FIG. 1 is an exemplary diagram of a measuring apparatus according to the first embodiment of the invention, FIGS. 2A and 2B are exemplary diagrams showing the configuration of a part of the measuring apparatus which is centered at a scale base, FIG. 3 is a perspective view of the part of the measuring apparatus which is centered at the scale base, FIG. 4 is an enlarged perspective view of a portion IV which is circled in FIG. 3, FIG. 5 is an exemplary diagram of the part of the measuring apparatus which is centered at the scale base, and FIGS. 6A and 6B show sectional views taken along the lines VIA-VIA and VIB-VIB shown in FIG. 5.

Firstly, an overall configuration of a measuring apparatus according to the first embodiment will be described by the use of FIG. 1.

As is shown in FIG. 1, for example, a measuring apparatus 100 is an image measuring machine and includes a table 130 which can move in a Y direction on a base 110. In addition, a portal frame is provided on the base 110. The portal frame is made up of a pair columns 132 which rise from the base 110 and a beam 134 which is provided in such a manner as to extend between the pair of columns 132. The columns 132 support the beam 134, and a slider 136 provided on the beam 134 is made to move along the beam 134 (in an X direction). An image measuring optical system 138 is provided on the slider 136, and the image measuring optical system 138 has a CCD camera. In addition, the image measuring optical system 138 is made to move on the slider 136 in a Z direction. The measuring apparatus 100 that is configured as has been described above is such that the image measuring optical system 138 is made to move relatively to a specific position in the X, Y, and Z directions of an object to be measured with high accuracy by a moving mechanism made up of the table 130 and the slider 136, so as to observe a minute image of the object to be measured to thereby enable a measurement of a specific distance configuration from image information obtained from the observation.

In addition, as is shown in FIG. 1, a scale base 112 is provided between the base 110 and the table 130. The scale base 112 is fixed on to the base 110 in a plurality of locations, and a scale 116 is supported on the scale base 112 in a plurality of locations. Namely, the measuring apparatus 100 includes the base 110, the scale base 112 which is fixed on to the base 110 and the scale 116 which is supported on the scale base 112. In addition, graduations are provided on the scale 116 in the Y direction, which constitutes a measuring direction, for reading by a detector, not shown, so as to measure a displacement of the table 130 which moves in the Y direction. Namely, the scale base 112 is fixed on to the base 110 in the plurality of locations lying in the measuring direction (the Y direction) in which measurement based on the scale 116 is carried out. In addition, in this embodiment, the base 110, the scale base 112 and the scale 116 are made of different types of materials from each other; the base 110 is made of stone, the scale base 112 of a metal whose main constituent is iron and the scale 116 of glass.

Next, by the use of FIGS. 2A and 2B, a relationship between the scale base 112 and associated members will be described.

As is shown in FIGS. 2A and 2B, there are provided in the scale base 112 a plurality of slits 114 (four slits in the figures) and a plurality fixing holes 118 (three fixing holes in the figures) for fixing the scales base 112 to the base 110. The slits 114 are provided between positions P1, P2, P3 where the fixing holes 118 are provided. In addition, a cut-out portion 112A is provided on the scale base 112 for supporting the scale 116. Bolts, not shown, are inserted into the fixing holes 118 so as to fix the scale base 112 to the base 110. A first fastening plate 122 and second fastening plates 124, 125 are fixed with machine screws 126 to the scale base 112 in the positions P1, P2, P3 where the fixing holes 118 are provided and which are aligned in the Y direction for supporting the scale 116 in the cut-out portion 112A on the scale base 112. Namely, the slits 114 are provided in the scale base 112 between the locations P1, P2, P3 where the scale base 112 is fixed to the base 110. In addition, the scale 116 is supported by the scale base 112 in the locations P1, P2, P3. In addition, gaps S1 are provided between the scale base 112 and the base 110 in positions other than the locations P1, P2, P3 where the scale base 112 is fixed to the base 110. Additionally, gaps S2, S3 are provided between the scale base 112 and the scale 116 in positions other than the positions where the scale base 112 supports the scale 116 in a similar way. The members described above will be described in greater detail later.

In addition, as is shown in FIGS. 2A and 2B, a raised portion is provided at one end of the scale base 112 and is disposed in the vicinity of the position (at a left end as viewed in FIGS. 2A and 2B) where the first fastening plate 122 is provided. The raised portion 120 is a means for restricting the scale 116 supported in the cut-out portion 112A on the scale base 112 from moving leftwards in the measuring direction (the Y direction). In this embodiment, since an origin of the scale 116 is provided on a left-hand side of FIGS. 2A and 2B, the raised portion 120 restricts the origin of the scale 116 from moving to the left-hand side of FIGS. 2A and 2B.

Next, the slit 114 and the second fastening plate 125 will be described in detail which are shown in FIG. 4 showing in an enlarged fashion a portion IV circled in FIG. 3.

As is shown in FIG. 4, the slit 114 has a construction in which slits are cut in the scale base 112, which is made integral in the Y direction, in two directions from top and bottom of the scale base 112 with a width S. Because of this, even when the scale base 112 expands or contracts in the Y direction, an expansion or contraction amount can be absorbed by the gaps S. In addition, even though the plurality of slits 114 are provided, the linearity of the scale base 112 can be maintained to a high level. Here, in the event that the scale base 112 is divided into a plurality of blocks, as with this embodiment, the scale 116 can be prevented from being affected by thermal expansion or contraction of the scale base 112. However, since the divided blocks need to support the scale 116, there is caused a troublesome operation in which the divided blocks have to be positioned accurately with high linearity for attachment to the base 110.

In contrast to this, in this embodiment, although the slits 114 are provided, the scale base 112 is not divided. Namely, the embodiment has an advantage that the positioning of the scale base 112 on the base 110 for attachment of the former to the latter becomes as easy as attaching a scale base without any slit to the base. Note that the slits 114 are provided in such a manner as to lie so near as to be adjacent to the positions of the first fastening plate 122 and the second fastening plates 124, 125 which support the scale 116, as is shown in FIGS. 2A, 2B, 3. Because of this, the slits 114 are provided in such a manner that two slits 114 exist between the first fastening plate 122 and the second fastening plate 124 and two slits 114 exist between the second fastening plate 124 and the second fastening plate 125.

As is shown in FIG. 4, the second fastening plate 125 is made up of an elastic member as with the first and second fastening plates 122 124, and for example, a plate spring can be used. Because of this, the second fastening plate 125 is attached to the scale base 112 with two machine screws 126, so as to apply an appropriate pressure to the scale 116 for stable support thereof by the scale base 112 (this will also be true with the first fastening plate 122 and the second fastening plate 124).

In the second fastening plates 124, 125, a central portion is cut out and portions remaining at both ends thereof for pressing the scale 116 have at distal ends bent portions 124A, 125A which are made to swell towards the scale 116. In addition, no cut-out is provided at a central portion of the first fastening plate 122. Because of this, the first fastening plate 122 can press the scale 116 with a stronger force than the second fastening plates 124, 125. Namely, even when the scale 116 expands or contracts, the scale 116 is made difficult to slide while the scale 116 is made easy to slide in the vicinity of the second fastening plates 124, 125. Therefore, even though the scale 116 expands or contracts, a large magnitude of stress is not applied but is absorbed. In addition, as is shown in FIG. 4, the scale 116 which is being pressed against by the first fastening plate 122 and the second fastening plates 124, 125 is supported on the scale base 112 via a friction reduction material 128. Because of this, the scale base 112 and the scale 116 are made easy to slide relative to each other, and even when the scale 116 expands or contracts, such expansion or contraction of the scale 116 is not disturbed, thereby making it possible to prevent the application of excessive stress to the scale 116.

Next, by the use of FIGS. 6A, 6B which are the sectional views taken along the two lines shown in FIG. 5, the gaps will be described which are defined between the base 110 and the scale base 112 and between the scale base 112 and the scale 116.

The sectional view shown in FIG. 6A is a sectional view taken in the position P1 which lies at the center of the first fastening plate 122 attached in place with the two machine screws 126 in the Y direction. The fixing hole 118 for attaching the scale base 112 to the base 110 exists in this position. In addition, the friction reduction material 128 is brought into abutment with the cut-out portion 112A provided on the scale base 112, and further, the scale 116 is brought into abutment with the friction reduction material 128. Then, the bent portion 122A of the first fastening plate 122 secured with the machine screws 126 is constructed in such a manner as to press the scale 116. Namely, no gap is provided in this position, and the scale 116 is pressed against by the first fastening plate 122 via the friction reduction material 128 and is supported on the scale base 112.

A position shown in FIG. 6B is an intermediate position (refer to FIG. 5) between the two slits 114 lying between the first fastening plate 122 and the second fastening plate 124 which press against the scale 116. Here exists the gap S1 (in the Z direction) between the base 110, not shown, and the scale base 112, and the gap S2 (in the X direction) also exists between the scale base 112 and the friction reduction material 128. Further, the gap S3 exists between the scale base 112 and a lower surface (in the Z direction) of the scale 116. Namely, recessed portions having the difference in gap S1 are provided in the scale base 112 facing the base 110 and recessed portions having the differences in gaps S2, S3 are provided respectively in the X direction and the Y direction in the cut-out portion 112A of the scale base 112 facing the base 110 in positions other than the positions where the scale 116 is supported (in the positions in the Y direction) on the scale base 112. Namely, in the position shown in FIG. 6B, the scale base 112 is constructed in such a manner as not to contact the base 110 and the scale 116. Because of this, the scale 116 is not affected by expansion or contraction of the scale base 112 in the locations other than those where the scale 116 is supported on the scale base 112, and the scale base 112 is also not affected by expansion or contraction of the base 110.

Next, the function of the measuring apparatus of the embodiment will be described.

As has been described before, the base 110, the scale base 112 and the scale 116 are made of the different types of materials. Specifically, the base 110 is made of stone whose thermal expansion coefficient is about $5 \times 10^{-6}$/K, the scale base 112 is made of iron whose thermal expansion coefficient is about $12 \times 10^{-6}$/K, and the scale 116 is made of glass whose thermal expansion coefficient is about $8 \times 10^{-6}$/K. Because of this, expansion or contraction amounts of the respective materials differ due to the different thermal expansion coefficients when there occurs a change in temperature. However, the plurality of slits 114 are provided in the scale base 112 in the locations lying between the positions where the scale base 112 supports the scale 116. Because of this, even though the thermal expansion coefficient of the material of the scale base 112 is high, the effect of expansion or contraction of the scale base 112 can be reduced by the slits 114 so provided, thereby making it possible to prevent the positions on the scale base 112 where the scale 116 is supported from being changed.

Further, the gaps S1, S2, S3 are provided respectively, between the base 110 and the scale base 112 which lie between the slits 114 and between the scale base 112 and the scale 116. Because of this, frictional force resulting from expansion or contraction due to a change in temperature is not transmitted from the base 110 to the scale base 112 or from the scale base 112 to the scale 116 in the portions where the gaps S1, S2, S3 exist. Because of this, the application of unnecessary stress to the scale 116 due to expansion or contraction of the base 110 and the scale base 112 can be prevented.

In addition, the positions P1, P2, P3 where the scale base 112 is fixed to the base 110 and the positions where the scale 116 is supported on the scale base 112 are the same in the Y direction which is the measuring direction in which measurement by the scale 116 is carried out. Because of this, it is not that the scale 116 is supported based on the scale base 112 but that the scale 116 is supported based on the base 110. Namely, the accuracy at which the scale 116 is installed relative to the base 110 can be increased and the effect of expansion or contraction of the base 110 and the scale base 112 can be reduced further. Thus, for example, the correction of expansion or contraction amount of the scale 116 can be facilitated.

In addition, since the scale base 112 is configured into the integral body, the attachment of the scale base 112 to the measuring apparatus 100 becomes easy, and an accurate linearity for support of the scale 116 can easily be produced.

Additionally, since the first fastening plate 122 and the second fastening plates 124, 125 are made up of the elastic members, the application of an excessive pressure to the scale 116 can be prevented, and the deformation and generation of cracks in the scale 116 can be prevented.

In addition, even though expansion or contraction of the base 110 and the scale base 112 is transmitted to the scale 116, or even though the scale 116 itself expands or contracts, the movement of the scale 116 in the Y direction is restricted by the raised portion 120 provided in the vicinity of the first fastening plate 122. In this embodiment, since the origin of the scale 116 exists on the raised portion 120 side, the movement of the origin of the scale 116 to the raised portion 120 side is restricted effectively.

Further, the pressure applied by the first fastening plate 122 is larger than the pressures applied by the second fastening plates 124, 125. Because of this, the scale 116 slides more at the portions where the scale 116 is supported by the second fastening plates 124, 125 than at the portion where the scale 116 is fastened by the first fastening plate 122. Because of this, in the embodiment, the movement of the origin of the scale 116 can be suppressed to a minimum level, whereby the origin of the scale 116 can be held in a constant position without being affected by expansion or contraction of the respective members due to a change in temperature. As this occurs, no extra stress is applied to the scale 116 in any case owing to the effect of the friction reduction material 128 disposed between the scale base 112 and the scale 116. Because of this, even though the scale 116 expands or contracts, the expansion or contraction amount thereof can easily be corrected to hold it at the appropriate level.

Namely, according to the invention, even though the base 110, the scale base 112 and the scale 116 are made of the different types of materials, the deformation of the scale base 112 can be reduced. Because of this, the measurement of displacement by the scale 116 can be held at the highly accurate level. Namely, since the high measuring accuracy can be held even though the base, the scale base and the scale are made of different materials, optimum materials can be selected for the base, the scale base and the scale from the view points of workability, price or cost, functionality, fabrication properties, serviceability and the like, whereby both a highly accurate measurement and a low-priced measuring apparatus can be attained at the same time.

While the invention has been described based on the first embodiment thereof, needless to say, the invention is not limited to the embodiment. Namely, needless to say, the invention can be improved and modified in design variously without departing form the spirit and scope thereof.

For example, while in the embodiment, the scale base 112 supports the scale 116 in the locations where the scale base 112 is fixed, the invention is not limited thereto. The scale may be supported in two or more locations of the locations where the scale base is fixed.

In addition, for example, while in the embodiment, the measuring apparatus 100 has been described as being applied to the image measuring machine, the invention is not limited thereto but can be applied to a measuring apparatus for measuring various types of displacements with high accuracy. Then, as this occurs, needless to say, the invention can be applied not only in the Y direction but also in the X and Z directions.

Additionally, for example, while in the embodiment, the slits are provided in the vicinity of the fastening plates, the invention is not limited thereto. In addition, the number of slits provided can be increased or decreased based on positions and distances of the first and second fastening plates which vary depending upon the length of the scale, and the cutting width of the slits can also be changed. In addition, the numbers of the first and second fastening plates are not limited to those of the embodiment. Furthermore, the materials of the base 110, the scale base 112 and the scale 116 are not limited to those described in the embodiment.

What is claimed is:

1. A measuring apparatus comprising:
   a base;
   a scale base fixed to the base in a plurality of locations of the base which lie in a measuring direction in which measurement is implemented by; a scale, the scale being supported on the scale base; and
   a plurality of slits that are cut in the scale base in a position lying between the plurality of locations where the scale base is fixed to the base, the plurality of slits being made in two directions from a top and a bottom of the scale base, each of the plurality of slits having a gap, each gap of the plurality of the slits absorbing an expansion or contraction amount of the scale base in the measuring direction,
   wherein the scale is supported by the scale base at two or more of the plurality of locations where the scale base is fixed to the base.

2. A measuring apparatus as set forth in claim 1, further comprising:
   an elastic member which presses the scale against the scale base to thereby be supported on the scale base.

3. A measuring apparatus as set forth in claim 1, further comprising:
   a friction reduction material, via which the scale is supported on the scale base.

4. A measuring apparatus as set forth in claim 1, further comprising:
   a restricting member provided at one end of the scale base for restricting a movement of the scale in the measuring direction.

5. A measuring apparatus comprising:
   a base;
   a scale base fixed to the base in a plurality of locations of the base which lie in a measuring direction in which measurement is implemented by a scale, the scale being supported on the scale base;
   at least a slit provided in the scale base in a position lying between the locations where the scale base is fixed to the base; and
   a restricting member provided at one end of the scale base for restricting a movement of the scale in the measuring direction,
   wherein the scale is supported by the scale base at two or more of the plurality of locations where the scale base is fixed to the base, and
   the scale base has gaps between the base and the scale base in positions other than the locations where the scale base is fixed to the base and between the scale and the scale base in positions other than the locations where the scale base supports the scale, respectively.

6. A measuring apparatus as set forth in claim 5, wherein the restricting member is a raised portion.

7. A measuring apparatus as set forth in claim 5, further comprising:
   an elastic member which presses the scale against the scale base to thereby be supported on the scale base.

8. A measuring apparatus as set forth in claim 5, further comprising:
   a friction reduction material, via which the scale is supported on the scale base.

* * * * *